(12) United States Patent
Fink

(10) Patent No.: US 8,977,691 B2
(45) Date of Patent: Mar. 10, 2015

(54) IMPLEMENTATION OF AN EXTRANET SERVER FROM WITHIN AN INTRANET

(75) Inventor: Ronald Fink, Bryn Mawr, PA (US)

(73) Assignee: Teradata US, Inc., Dayton, OH (US)

( * ) Notice: Subject to any disclaimer, the term of this patent is extended or adjusted under 35 U.S.C. 154(b) by 1860 days.

(21) Appl. No.: 11/476,450

(22) Filed: Jun. 28, 2006

(65) Prior Publication Data

US 2008/0005248 A1    Jan. 3, 2008

(51) Int. Cl.
| | |
|---|---|
| G06F 15/16 | (2006.01) |
| G06F 17/30 | (2006.01) |
| G06Q 10/10 | (2012.01) |
| H04L 29/06 | (2006.01) |
| H04L 12/58 | (2006.01) |

(52) U.S. Cl.
CPC .......... *G06F 17/3089* (2013.01); *G06Q 10/107* (2013.01); *H04L 63/029* (2013.01); *H04L 51/18* (2013.01); *H04L 12/58* (2013.01); *H04L 29/06* (2013.01); *H04L 63/10* (2013.01); *H04L 51/08* (2013.01)
USPC .......... 709/206; 709/202; 709/204; 709/205; 709/217; 726/1; 726/11; 726/21

(58) Field of Classification Search
CPC ........ G06Q 10/10; H04L 43/04; H04L 63/10; H04L 63/1416; H04L 63/20; H04L 63/14; H04L 63/1425; H04L 63/1433; H04L 63/1441; H04L 63/1466
USPC .................. 709/204, 205, 201, 206, 217, 223
See application file for complete search history.

(56) References Cited

U.S. PATENT DOCUMENTS

| | | | |
|---|---|---|---|
| 2002/0141380 A1* | 10/2002 | Koguchi .................. | 370/351 |
| 2003/0120812 A1* | 6/2003 | Nitta ....................... | 709/246 |
| 2004/0196307 A1* | 10/2004 | Zak et al. ................. | 345/733 |
| 2004/0234046 A1* | 11/2004 | Skladman et al. ........ | 379/88.13 |
| 2004/0260698 A1* | 12/2004 | MacMillan ............... | 707/9 |
| 2005/0015617 A1* | 1/2005 | Karsten .................... | 713/201 |
| 2005/0055404 A1* | 3/2005 | Kitchen, Jr. .............. | 709/206 |
| 2005/0120087 A1* | 6/2005 | Sekiguchi ................. | 709/206 |
| 2005/0198158 A1* | 9/2005 | Fabre et al. .............. | 709/206 |
| 2006/0015755 A1* | 1/2006 | Jaffe ........................ | 713/193 |
| 2006/0085503 A1* | 4/2006 | Stoye et al. .............. | 709/206 |
| 2006/0155810 A1* | 7/2006 | Butcher ................... | 709/206 |
| 2006/0256770 A1* | 11/2006 | Caci ........................ | 370/352 |
| 2007/0169184 A1* | 7/2007 | Krywaniuk ............... | 726/11 |
| 2007/0220125 A1* | 9/2007 | Li et al. ................... | 709/223 |
| 2007/0286159 A1* | 12/2007 | Preiss et al. ............. | 370/352 |
| 2008/0098472 A1* | 4/2008 | Enomoto et al. ......... | 726/12 |

FOREIGN PATENT DOCUMENTS

WO   WO 2006011464 A1 *   2/2006

* cited by examiner

*Primary Examiner* — Melanie Jagannathan
*Assistant Examiner* — Najeebuddin Ansari
(74) *Attorney, Agent, or Firm* — Gates & Cooper, LLP

(57) ABSTRACT

A request for information or services available on an intranet may be made by users on an extranet outside the intranet. An email is generated in an external server on the extranet in response to the request for information or services, and then sent from the external server to an internal server inside the intranet. The email comprises one or more approved forms based on the request, wherein specifics of the request are embedded into the body of the email. The email is processed at the internal server, in order to generate a response to the request, wherein the response is returned by the internal server to the external server in a reply email. The reply email includes an attachment containing the results of the processing performed by the internal server. The external server allows the user to access these results via an external graphical user interface.

14 Claims, 4 Drawing Sheets

IMPLEMENTATION OF AN EXTRANET SERVER FROM WITHIN AN INTRANET

BACKGROUND OF THE INVENTION

1. Field of the Invention

This invention relates to the implementation of an extranet server from within an intranet.

2. Description of Related Art

Many corporations maintain an intranet or internal network for use within their organizations in order to protect the loss of proprietary data through unrestricted access to data by outsiders and to protect the internal network from viruses, worms, etc., which can be delivered by email.

This sometimes presents severe limitations when the objective is to allow a user on an extranet (e.g., the Internet) outside the intranet to obtain information (e.g., access to databases) and access services (e.g., perform functions), which are available on the intranet but not outside the intranet.

This is especially problematic when the user is an employee of the intranet owner, but is not in a position to enter the intranet through a secure gateway.

What is needed in the art, then, is a method of providing the services outside the intranet without compromising the security concerns described above. The present invention satisfies that need.

SUMMARY OF THE INVENTION

The present invention discloses a method, apparatus and article of manufacture for processing a request for information or services available on an intranet to users on an extranet outside the intranet.

An email is generated in an external server outside the intranet in response to a request for information or services, and then sent from an external server to an internal server inside the intranet via an email server. The email is processed at the internal server in order to generate a response to the request for information or services that is then returned by the internal server to the external server.

The email comprises one or more approved forms based on the request, wherein specifics of the request for information or services are embedded into the body of the email. In one embodiment, the request may comprise inserts, queries, reports or updates against a proprietary database, wherein the specifics of the request identify which records to add, retrieve or update in the proprietary database.

The internal server invokes and executes one or more predefined programs to process the email, wherein the predefined programs perform one or more approved functions based on the form of the email and the specifics of the request that are embedded into a body of the email.

This response sent from the internal server to the external server in a reply email that is automatically created in response to the email received from the external server. The response includes an attachment to the reply email containing the results of one or more functions performed by the internal server when responding to the request for information or services. The attachment is in a form readable only by the internal server and external server.

The response is processed in the external server, wherein the external server allows the user to access the results via some appropriate subset of functions performed by an external graphical user interface.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1:
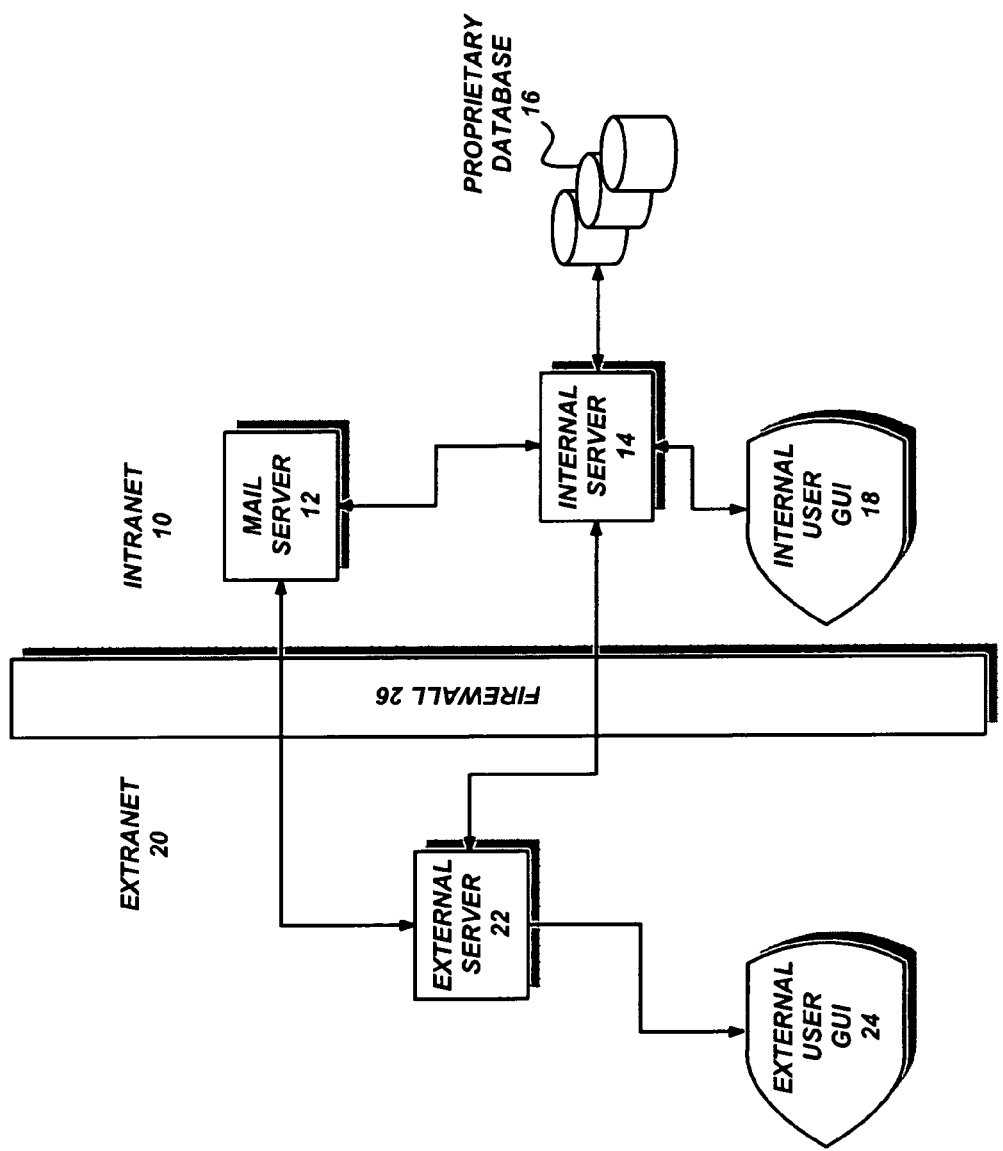
FIG. 1 illustrates an exemplary hardware and software environment according to the preferred embodiment of the present invention.

FIG. 1 illustrates an exemplary hardware and software environment according to the preferred embodiment of the present invention.

In this exemplary environment is an intranet 10 including a mail server 12 and an internal server 14 managing a proprietary database 16 and providing an internal user graphical user interface (GUI) 18. Also in this exemplary environment is an extranet 20 including an external server 22 providing an external user GUI 24. Separating the intranet 10 from the extranet 20 is a firewall 26, which is a hardware or software gateway that limits access between the networks 10, 20, in accordance with a predefined security policy, in order to protect the resources of the intranet 10 from users of the extranet 20.

This exemplary environment performs a computer-implemented method of processing a request for information or services available on an intranet to users outside the intranet.

Moreover, in the present invention, the internal server 12 performs the following functions that are available to users on the intranet 10:

1. The internal user GUI 18 and accompanying programs that accept information from users and stores the information into the proprietary database 16.

2. The internal user GUI 18 and accompanying programs that allow users to view and manipulate the information stored in the proprietary database 16.

3. The internal user GUI 18 and accompanying programs that allow the users to filter and extract information from the proprietary database 16.

Initial System Setup

Figure 2:
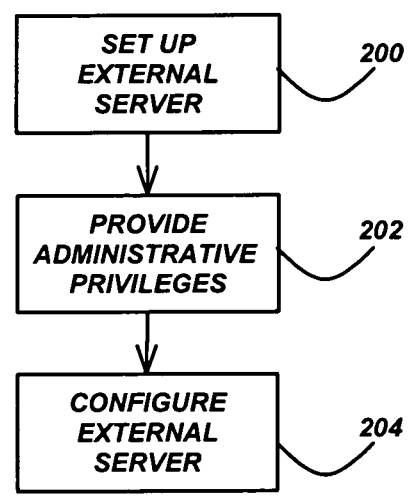
FIG. 2 is a flowchart that illustrates the steps performed in an initial setup of the system according to the preferred embodiment of the present invention.

FIG. 2 is a flowchart that illustrates the steps performed in an initial setup of the system according to the preferred embodiment of the present invention.

Block 200 represents the external server 22 being set up on the extranet 20 outside the intranet 10.

Block 202 represents the administrative privileges for the external server 22 being provided to the internal server 14. Essentially, the internal server 14 logs onto the external server 22, in order to administer users.

Block 204 represents the external server 22 being configured such that some appropriate subset of functions performed by the internal user GUI 18 may be performed by the external user GUI 24.

Handling Incoming Requests

Figure 3:
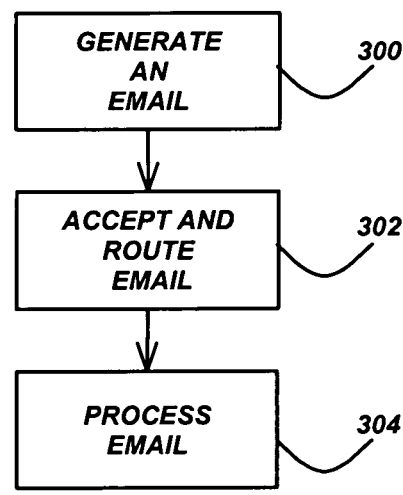
FIG. 3 is a flowchart that illustrates the steps performed in handling incoming requests according to the preferred embodiment of the present invention.

FIG. 3 is a flowchart that illustrates the steps performed in handling incoming requests (e.g., a request for the input or output of data) according to the preferred embodiment of the present invention.

Block 300 represents the external server 22 generating an email in response to a request for information or services, using available system functions, and according to one or more outgoing email restrictions. These restrictions may include the following:

1. The email can only be sent from the external server 22 to the internal server 14 via the email server 12.
2. The email comprises one or more approved forms, based on the user's request. For example, using the functions of the external user GUI 24, the user generates requests for inserts, queries, reports, updates, etc., against the proprietary database 16, which are then used to select the form of the email.
3. The body of the email is created by the functions of the external user GUI 24, based on the user's request. For example, the specifics of the user's request, e.g., identifying which records to add, retrieve or update in the proprietary database 16, are embedded into the body of the email.
4. The email is then sent from the external server 22 to the internal server 14 via the email server 12. In one embodiment, the email can only be sent from the external server to the internal server.

Block 302 represents the mail server 12 accepting the email from the external server 22 and routing it to the internal server 14.

Block 304 represents the internal server 14 processing the email in order to generate a response to the request for information or services. This may entail the internal server 14 invoking and executing one or more predefined programs to process the email, wherein the predefined programs perform one or more approved functions based on the form of the email and the specifics of the request that are embedded into the body of the email. The results of these functions are handled in a manner described in more detail below.

Handling Outgoing Information

Figure 4:
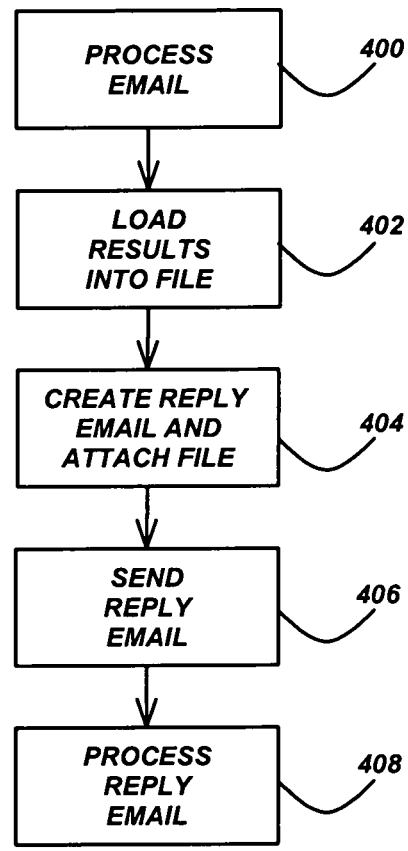
FIG. 4 is a flowchart that illustrates the steps performed in handling outgoing information according to the preferred embodiment of the present invention.

FIG. 4 is a flowchart that illustrates the steps performed in handling outgoing information according to the preferred embodiment of the present invention.

Block 400 represents the internal server 14 processing the email in order to generate a response to the request for information or services, as represented above in Block 304. Preferably, the functions performed by the predefined programs may comprise inserts, queries, reports, updates, etc., against the proprietary database 16.

Block 402 represents the internal server 14 loading the results of the functions into a file. In one embodiment, the file is in a form readable only by the internal server 14 and external server 22 for security purposes.

Block 404 represents the internal server 14 automatically creating an outgoing email in reply to the email received from the external server 22, wherein the file is added as an attachment to the email. This reply email and its file attachment comprises the response to the user's request for information and services.

Block 406 represents the reply email then being sent from the internal server 14 to the external server 22. This reply email can be sent to the external server 22 through the mail server 12, or can be sent directly to the external server 22 if the internal server 14 has a direct connection to the extranet 20.

Block 408 represents the external server 22 processing the reply email, including the file added as an attachment to the email. Specifically, the external server 22 unloads the results from the file, and allows the user to access the results via some appropriate subset of functions performed by the external user GUI 24.

Consequently, the architecture of the present invention allows a corporation to provide some of the functions available on its intranet 10 and access to restricted parts of its proprietary database 16 to accredited users outside the intranet 10, with a single point of administration. Security can be explicitly administrated on a single system (i.e., internal server 14) or by the normal intranet 10 structure.

Modifications and Variations

Although FIG. 1 shows the internal server 14 as a separate server that is dedicated to handling requests from the external server 22, alternative embodiments may have the functions of the internal server 14 performed by the mail server 12 or the functions of the mail server 12 performed by the internal server 14.

To establish and maintain security, the administration of the interplay the mail server 12, internal server 14, and external server 22 is performed at the internal server 14. The set of administration functions performed by the internal server 14 include:

Identifying users whose mail can be forwarded from the mail server 12 to the internal server 14. This is a list of the employees who can make queries, etc.

Specifying rules for handling exceptions. For example, if an unauthorized user attempts to perform a function on the external server 22 that results in the external server 22 generating an email as describe above, the email may be ignored and an exception or error message will be sent to administrator about unauthorized access.

Identifying the functions that are allowed in the email requests. Other functions will automatically be denied, any associated email will be ignored, and an exception or error message will be sent to administrator with unauthorized function request.

Coordinating encryption functions. When new encryption keys are to be implemented, the new key, encrypted in the existing key, along with start date and time, are sent by the administrator to the authorized users' internal mail accounts.

These types of administration functions are necessary to satisfy security concerns.

To enhance overall security, especially as it relates to incoming email, it is best to include security functions on the mail server 12. In addition, the internal server 14 can be configured to accept only email that has been forwarded from the mail server 12 and/or originated from the external server 22, so that the internal server 14 only needs to check whether the email is one of the accepted forms.

Security can also be enhanced by programs that implement authentication functions and determine the correctness of the data supplied by any requests. Once the data is approved, it can then be entered into the proprietary database 16.

A number of steps are involved in handling control of access to the external server 22, and thus access to these programs provided by the internal server 14 to the external server 22. For example, all control of access to the external server 22 may be by specific login-password controls. Moreover, the administration of these controls should be performed by the internal server 14. In this regard, the internal server 14 will download the necessary files to the external server 22 for proper access control, security and authentication.

CONCLUSION

This concludes the description of the preferred embodiment of the invention. The following paragraphs describe some alternative embodiments for accomplishing the same invention.

In one alternative embodiment, any type of computer or configuration of computers could be used to implement the present invention. In addition, any number of different applications could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method of processing a request for information or services available on an intranet to users outside the intranet, comprising:
   (a) receiving a request for information or services from a user at an external server, wherein the information or services are available on an internal server inside an intranet and the external server is outside the intranet;
   (b) automatically generating a request email in the external server in response to the request for information or services, wherein specifics of the request for information or services are embedded into the request email by the external server;
   (c) sending the request email from the external server outside the intranet to the internal server inside the intranet;
   (d) processing the request email at the internal server inside the intranet in order to automatically generate a reply email in response to the request for information or services, wherein one or more functions are performed based on the specifics of the request for information or services embedded into the request email, the functions are performed against a database, results from the functions comprise the response to the request for information or services, specifics of the response are embedded into the reply email by the internal server, the response includes an attachment to the reply email containing the results from the functions, and the attachment is in a form accessible and readable only by the internal server and external server; and
   (e) sending the reply email from the internal server inside the intranet to the external server outside the intranet; and
   (f) processing the reply email in the external server, in order to allow the user to access the response to the request for information or services.

2. The method of claim 1, wherein the request email is sent from the external server to the internal server via an email server.

3. The method of claim 1, wherein the request email can only be sent from the external server to the internal server.

4. The method of claim 1, wherein the request email comprises one or more approved forms based on the request for information or services.

5. The method of claim 1, wherein the request for information or services comprises inserts, queries, reports or updates against a database.

6. The method of claim 5, wherein the specifics of the request for information or services identify which records to add, retrieve or update in the database.

7. The method of claim 1, wherein the internal server invokes and executes one or more predefined programs to process the request email, and the predefined programs perform one or more approved functions based on the form of the request email and the specifics of the request for information or services that are embedded into the request email.

8. A computer-implemented apparatus for processing a request for information or services available on an intranet to users outside the intranet, comprising:
   (a) an external server, outside the intranet; and
   (b) an internal server, inside the intranet;
   (c) the external server being configured for receiving a request for information or services from a user, wherein the information or services are available on the internal server inside the intranet, and for automatically generating a request email in response to the request for information or services, wherein specifics of the request for information or services are embedded into the request email by the external server and the request email is sent from the external server outside the intranet to the internal server inside the intranet; and
   (d) the internal server being configured for processing the request email in order to automatically generate a reply email in response to the request for information or services, wherein one or more functions are performed based on the specifics of the request for information or services embedded into the request email, the functions are performed against a database, results from the functions comprise the response to the request for information or services, specifics of the response are embedded into the reply email by the internal server, the response includes an attachment to the reply email containing the results from the functions, the attachment is in a form accessible and readable only by the internal server and external server, and the reply email is sent from the internal server inside the intranet to the external server outside the intranet for processing the reply email, in order to allow the user to access the response to the request for information or services.

9. The apparatus of claim 8, wherein the request email is sent from the external server to the internal server via an email server.

10. The apparatus of claim 8, wherein the request email can only be sent from the external server to the internal server.

11. The apparatus of claim 8, wherein the request email comprises one or more approved forms based on the request for information or services.

12. The apparatus of claim 8, wherein the request for information or services comprises inserts, queries, reports or updates against a database.

13. The apparatus of claim 12, wherein the specifics of the request for information or services identify which records to add, retrieve or update in the database.

14. The apparatus of claim 8, wherein the internal server invokes and executes one or more predefined programs to process the request email, and the predefined programs perform one or more approved functions based on the form of the request email and the specifics of the request for information or services that are embedded into the request email.

* * * * *